United States Patent [19]

Oza

[11] Patent Number: 4,458,655
[45] Date of Patent: Jul. 10, 1984

[54] FUEL INJECTION NOZZLE WITH HEATED VALVE

[75] Inventor: Rajshekhar D. Oza, Troy, Mich.

[73] Assignee: General Motors Corporation, Detroit, Mich.

[21] Appl. No.: 507,743

[22] Filed: Jun. 27, 1983

[51] Int. Cl.$^3$ ............................................. F02M 31/00
[52] U.S. Cl. ................................... 123/558; 123/557; 239/135
[58] Field of Search .................. 123/557, 558, 298; 239/133, 135

[56] References Cited

U.S. PATENT DOCUMENTS

| | | | |
|---|---|---|---|
| 3,361,353 | 1/1968 | Millman | 123/558 |
| 3,408,007 | 10/1968 | Raichle | 239/133 |
| 3,648,669 | 3/1972 | Rank | 123/558 |
| 3,762,378 | 10/1973 | Bitonti | 123/557 |

OTHER PUBLICATIONS

Y. K. Kim, N. Iwai, H. Suto, T. Tsuruga, "Improvement of Alcohol Engine Performance by Flash Boiling Injection", SAE Review, No. 2, pp. 81–86, 1980.
Rajshekhar D. Oza and James F. Sinnamon, "An Experimental and Analytical Study of Flash-Boiling Fuel Injection", SAE 839590, 2/28–3/4/1983.

Primary Examiner—Ronald H. Lazarus
Attorney, Agent, or Firm—Arthur N. Krein

[57] ABSTRACT

A fuel injection nozzle with heated valve for flash boiling of fuel during injection includes a nozzle body of electrical conductive material with a spring biased valve of electrical conductive material operatively positioned in an axial extending fuel passage within the nozzle body so as to control the flow of fuel out through a discharge outlet at one end of the nozzle body. An electrical insulator sleeve encircles and is fixed to the valve intermediate the ends thereof so as to support a coiled electrical heater wire that is connected at one end to the valve adjacent to its tip end and which is connected at its opposite end to an electrical conductor sleeve that is fixed to the insulator sleeve. An electrical brush device is operatively associated with the nozzle body so that one end thereof is in sliding electrical contact with the conductor sleeve while its opposite end is connectable to a source of electrical power whereby an electrical current can be supplied to the heater wire to effect heating of fuel in the fuel passage prior to its discharge from the nozzle.

3 Claims, 3 Drawing Figures

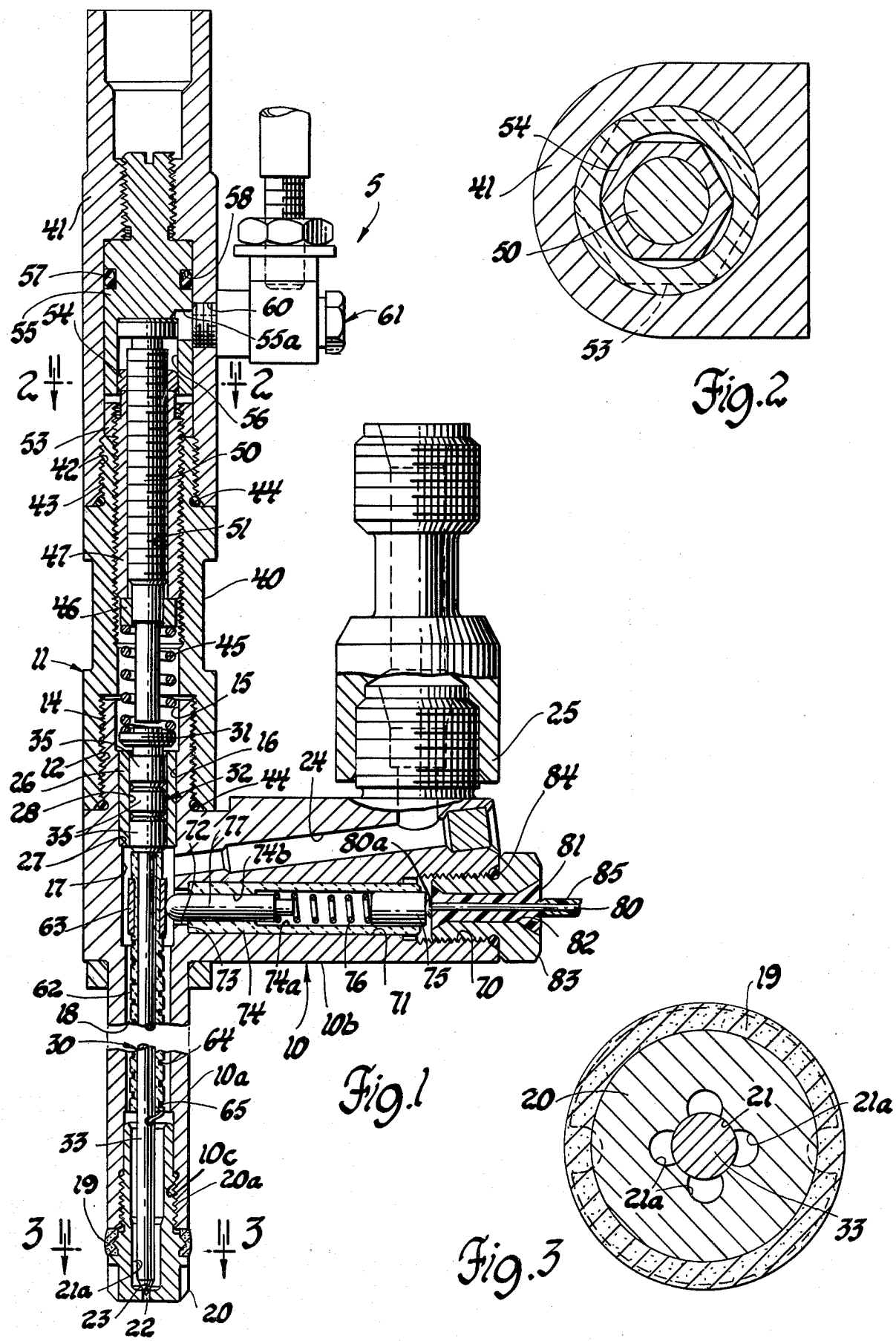

FUEL INJECTION NOZZLE WITH HEATED VALVE

FIELD OF THE INVENTION

This invention relates to fuel injection nozzles and, in particular, to a fuel injection nozzle with heated valve to effect flash boiling of fuel during injection.

DESCRIPTION OF THE PRIOR ART

The desirability of obtaining a thermally efficient combustible mixture in the operating cylinders of an internal combustion engine has long been recognized. To this end various proposals have been suggested regarding fuel injection nozzle structures for use in fuel injection systems, as used for example in direct-injection engines (either diesel or stratified charge) so as to provide for improved droplet sizes, spray angles and spray travel whereby to enhance fuel air mixing to obtain such a thermally efficient combustible mixture.

As an alternative to the above structural improvements in such nozzles, it has also recently been proposed to use a method called "flash boiling injection" whereby heated fuel is injected from a nozzle into the combustion chamber of an engine. Flash boiling is a phenomenon whereby a heated fluid boils instantaneously when the pressure around the fuel decreases below its saturation pressure. It is thus possible to make the fuel droplet size small, the angle of spray large and the spray travel short by applying this flash boiling injection principle. As a result, a combustion mixture can be formed in a cylinder to improve the thermal efficiency of the engine and to reduce the exhaust emission of unburnt fuel.

SUMMARY OF THE INVENTION

The present invention relates to a fuel injection nozzle having a spring biased valve movable in a nozzle body to control fuel discharge from the spray tip end of the nozzle body, with this valve having an electrical heating element mounted thereon and in electrical contact therewith, with the nozzle body having an electrical brush means associated therewith in a manner whereby to supply an electrical current to the heating element so as to effect heating of fuel within the nozzle body prior to its discharge so as to effect flash boiling injection of fuel.

It is, therefore, a primary object of this invention to provide a fuel injection nozzle with an electrical heating element therein which is electrically connectable to a source of electrical power whereby fuel can be heated within the nozzle so that flash boiling of the fuel will occur upon its discharge from the nozzle.

Another object of this invention is to provide a fuel injection nozzle having an electrical heater therein whereby fuel close to the discharge end of the nozzle can be heated so as to provide for the flash boiling injection of fuel.

A further object of this invention is to provide a fuel injection nozzle with an electrically heated valve to heat fuel within the nozzle so as to effect the flash boiling of fuel during injection.

For a better understanding of the invention, as well as other objects and further features thereof, reference is had to the following detailed description of the invention to be read in connection with the accompanying drawings.

BRIEF DESCRIPTION OF THE DRAWINGS

FIG. 1 is a longitudinal cross-sectional view of an exemplary embodiment of a fuel injection nozzle with heated valve in accordance with the invention, with the valve, lift limiting adjusting screw and electrical brushes thereof shown in elevation;

FIG. 2 is an enlarged cross-sectional view of the nozzle taken along line 2—2 of FIG. 1; and, FIG. 3 is an enlarged cross-sectional view of the nozzle taken along line 3—3 of FIG. 1 showing details of the flow passages in the injector tip thereof.

BRIEF DESCRIPTION OF A PREFERRED EMBODIMENT

Referring first to FIG. 1, the fuel injection nozzle 5, in the construction shown, has an injector nozzle housing or body that includes a nozzle body 10, a two-piece cap, generally designated 11, and an injector tip 20. As shown, the nozzle body 10 and cap 11 are suitably secured together as by having the internal threads 12 at the lower end of the cap 11 threadingly engaged with the external threads 14 provided on the upper end of the spray tip body 10.

In the illustrated construction, the spray tip body 10 is formed with a main body portion 10a and with a side body portion 10b extending radially outward therefrom adjacent to its upper end. The main body portion 10a is provided with a stepped bore therethrough so as to define in succession, starting at its upper end, a spring chamber 15, a bushing chamber 16, a fuel chamber 17 and an axial extending fuel passage 18, the lower end of which is provided with internal threads 10c.

In the construction shown, the main body portion 10a of the nozzle body 10 has the injector tip 20 suitably secured to its lower end as by being threaded at 20a thereto. The injector tip 20, as thus secured to the nozzle body 10, is provided with an axial guide bore 21, the wall of which is provided with axial extending grooved passages 21a, see FIG. 3, that are in flow communication at one end with the fuel passage 18 and which are in communication at their lower ends with one or more orifices 22, only one such spray orifice 22 being used in the embodiment illustrated, which orifice is located at the spray tip end of the injector tip. As shown, the spray tip 20 is also provided with an annular valve seat 23 located in the guide bore 21 so as to encircle the spray orifice 22 at the inboard or upstream end thereof, in terms of the direction of fuel flow through the passages 21a and the spray orifice 22.

As is conventional, a carbon stop seal 19 is positioned to the injector tip at a location between the radial shoulder 20a thereof and the lower end of the main body portion 10a of the nozzle body 10.

For the ingress of fuel to the fuel chamber 17, the side body portion 10b is provided with a fuel inlet passage 24 which at one end opens into the fuel chamber 17 and which at its other end is in flow communication with a fuel inlet conduit coupling 25 that is suitably secured to the side body portion 10b whereby the fuel injection nozzle can be connected to a conventional fuel injection pump, not shown, that is operative to deliver fuel under predetermined pulsating pressure.

Located within the bushing chamber 16, and secured as by a suitable adhesive to the internal wall of the main body portion 10a defining this chamber, is a sleeve or bushing 26 that is axially located whereby its lower end abuts against an annular internal shoulder 27. As shown, the bushing 26 has a central guide stem bore 28 therethrough for slidably engaging the upper enlarged guide stem end of an inward opening, needle type, injection valve generally designated 30.

In the embodiment illustrated, the injection valve 30 is provided with an upper, enlarged diameter spring abutment collar 31, an intermediate guide stem 32, of a size to be slidably received by the guide stem bore 28 of bushing 26, and an elongated lower stem 33 of predetermined external diameter relative to the inside diameter of guide bore 21 so as to be slidably received thereby and which terminates at a conical valve tip 34 of a size and configuration for sealing engagement with the valve seat 23. In the construction shown, the guide stem 32 is provided with axial spaced apart lands 35 that slidingly receive the bore 28 wall of the bushing 26.

To facilitate the assembly of components therein the extension cap 11 is, as described hereinabove, of two-piece construction so as to include a tubular adaptor sleeve 40 and a cap 41 suitably secured together as by having the internal threads 42 of the cap threadingly engaged with the external threads 43 provided on the upper end of the adaptor sleeve 40, with reference to FIG. 1.

Suitable seals such as O-rings 44 are used to effect a fluid tight seal between the adaptor sleeve 40 end the spray tip body 10 and between the adaptor sleeve 40 and the cap 41.

A coil spring 45 is positioned so that one end thereof is loosely received in the spring chamber 15 for abutment against the upper end of the spring abutment collar 31 of valve 30, while its opposite end extends into the adaptor sleeve 40 so as to abut against a spacer ring 46 that is axially positioned by means of an adjusting screw 47 threadingly engaged in the upper end of the adaptor sleeve 40.

A lift limit adjusting screw 50 is threadingly received in the internal threaded bore 51 of the adjusting screw 47 with its lower end positioned a predetermined distance from the upper end of the valve 30, as desired, when the valve 30 is in seating engagement with the valve seat 23. With this arrangement, the maximum lift of valve 30 can be limited as desired. To releasably fix the axial position of these adjusting screws, lock nuts 53 and 54 are threaded on the adjusting screw 47 and lift limit adjusting screw 50, respectively, in a conventional manner, as shown in FIGS. 1 and 2.

With the arrangement shown, the spring 45 is operative to act as a biasing means to normally bias the valve 30 to its closed positioned, a position at which its valve tip 34 is in seating engagement with the valve seat 23.

In the embodiment shown, the cap 41 was of tubular configuration and, accordingly, a plug 55, with a blind bore 56 at its lower end, is threadingly received by the cap 41 and is sealed relative thereto by means of an O-ring seal 57 located in an annular groove 58 provided for this purpose in the plug 55.

A radial port 55a in plug 55 and an aligned port 60 in the extension cap 41 which is adapted to receive a suitable spill or bleed fitting 61 are used to permit any fuel bleeding into this cap 41 to be returned back to a low fuel pressure area, for example, the storage tank for fuel for an engine.

The fuel injection nozzle 5, as thus far described, is of conventional construction and, as well known, the elements thereof are made of suitable hard and strong materials, such as steel, which are capable of withstanding the normal working pressures and temperatures such nozzles are subjected to as used in internal combustion engines. These materials, such as steel, are also normally electrically conductive. Accordingly, in the construction shown, the spray tip body 10, spray tip 20, bushing 26, valve 30, the coil spring 45, spacer ring 46, cap 11 and adjusting screw 47 are all made of suitable electrically conductive material, such as steel.

Now in accordance with a feature of the invention in order to provide for the heating of fuel within the nozzle close to its point of discharge therefrom, a suitable electrical heater is operatively located within the nozzle body 10. For this purpose, an insulating tube 62, of a suitable electrical nonconductive material, such as a ceramic material, is suitably secured, as by an adhesive, to the valve for movement therewith. As shown, the insulator tube 62 is positioned so as to encircle the upper portion of the valve stem 33 whereby to extend from the valve stem guide 32 axially downward a predetermined axial distance so as to terminate at a location above the injector tip 20.

Adjacent to its upper end with reference to FIG. 1, the insulator tube 62 is provided with an encircling band or sleeve 63 of electrical conductive material, such as copper, which in the construction shown was electrodeposited onto the reduced diameter portion at this end of the ceramic insulator tube 62 along a predetermined axial extent thereof. The insulator tube 62 is also provided with a helical groove 64 on the outer surface thereof so as to extend downward from the sleeve 63 to its opposite end.

A suitable electrical resistance heater element such as a heater wire or ribbon 65 is wound around the insulator tube 62 so as to be supported in the helical groove 64 thereon, with one end thereof secured, as by solder, to the sleeve 63 and its opposite end to the valve stem 33 next adjacent to the lower end of the insulator tube 62.

In order to provide electrical current to this heater element, the side body portion 10b is provided with a stepped bore therethrough that opens into the fuel chamber at a location adjacent to the sleeve 63 on the insulator tube 62 encircling valve 30. This stepped bore defines in succession, starting from the free end of the side body portion 10b, an internally threaded wall 70, an intermediate wall 71 and an end wall 72, with walls 71 and 72 being of progressively reduced internal diameters relative to the internal diameter of wall 70. As shown, walls 71 and 72 are interconnected by a flat shoulder 73.

An insulator tube 74, of suitable electrical insulating material, is supported by wall 71 and is axially positioned so that the inboard end thereof, the left hand end with reference to FIG. 1, abuts against the shoulder 73.

An electrical plunger contact pin 75 is positioned in the enlarged diameter bore wall 74a of the tube 74 to serve as an abutment stop for one end of an electrical conductive brush spring 76, the opposite end of this spring abutting against an electrical conductive contact, in the form of a carbon brush 77 that is slidably received in the reduced diameter bore wall 74b of the tube 74. As shown, the brush 77 is of a suitable external diameter whereby it can loosely extend through the opening defined by the wall 72 so as to be in sliding contact with the sleeve 63 as the brush 77 is biased thereagainst by means of the spring 76.

Electrical current is supplied to the electrical contact pin 75 and thus to brush 77 via spring 76, by means of an electrical contact 80, which, in the construction shown, is in the form of a copper rod having an enlarged contact head 80a at one end thereof for abutment against the contact pin 75 and to serve as a stop for this pin. The contact 80 is suitably secured in a sleeve 81 fixed in the axial stepped bore 82 in a nut fitting 83 that is threadingly engaged in the internal threaded wall 70. In the construction shown, the contact 80 is fixed to the nut fitting 83 as by being embedded in an electrical insulating sleeve 81 of epoxy cement formed in place in bore 82. A suitable seal, such as O-ring 84, is positioned to effect a seal between the nut fitting 83 and the side body portion 10b.

The electrical contact 80 at its free end and the nozzle body 10 are adapted to be connected to the terminals of a suitable source of electrical power, not shown, whereby an electrical current can be supplied to the heater wire 65. As would be conventional, an electrical insulating material, such as insulator sleeve 81 is positioned to encircle the electrical conductor or contact 80 from adjacent to the epoxy cement along its full axial length up to a point adjacent to its terminal connection to an associate power source, not shown.

During operation of the subject fuel injection nozzle, electrical circuit would be applied to the nozzle so as to effect heating of the fuel therein. The continuity of this circuit which extends from contact 80 via contact pin 75, spring 76 and brush 77 to the sleeve 63 and then from the sleeve 63 via the heater wire 65 to the valve 30 via its stem 33 and then to the main body portion 10a. As will be apparent, when the valve tip 34 of valve 30 is seated against the valve seat 23, an electrical connection will, in effect, be established between the valve 30 and valve body 10. In addition, in the construction shown, the axial spaced apart lands 35 on the valve stem guide 32 sliding against the bore wall of the bushing 26 will complete an electrical circuit via this bushing to the nozzle body 10. Furthermore, an electrical interconnection between the valve 30 and the body 10 will also be completed via the spring 45, spacer screw 46 and adjusting screw 47.

It should now be understood by those skilled in the art, that the type and size of the heater wire 65 and the electrical input to this heater wire for a given nozzle/fuel/engine application would be preselected as a function of the type of fuel to be injected, the desired range of injection temperature of the fuel and the ratio of injection pressure to combustion chamber pressure at injection. Preferably, the temperature of fuel at the time of injection should be in the range of at least 300° K. to 380° K. and preferably higher and that the ratio of injection pressure to combustion chamber pressure should preferably be 20 or higher in order to obtain suitable flash boiling at injection with a large spray cone angle.

It is to be realized however that, as desired, the fuel can be preheated to a preselected temperature below the desired injection temperature, prior to its delivery to the fuel injection nozzle 5. If the fuel is thus preheated then, of course, less heating of the fuel within the injection nozzle by means of the subject heated valve would be required to effect flash boiling injection.

While the invention has been described with reference to the structure disclosed herein, it is not confined to the specific details set forth, since it is apparent that many modifications and changes can be made by those skilled in the art. This application is therefore intended to cover such modifications or changes as may come within the purposes of the improvements or scope of the following claims.

The embodiments of this invention in which an exclusive property or privilege is claimed are defined as follows:

1. A fuel injection nozzle for use to effect flash injection of fuel, said nozzle including a nozzle body means of electrical conductive material having a spray outlet orifice means at one end thereof and a fuel passage means connectable at one end to a source of pressurized fuel, said fuel passage means at its other end being in communication with said spray outlet orifice means and having a valve seat upstream of said spray outlet orifice means, a valve of electrical conductive material operably positioned in said fuel passage means for movement into and out of engagement with said valve seat, a spring means operatively associated with said valve to normally bias it into engagement with said valve seat; an electrical heater means operatively associated with said valve in a position to effect heating of fuel within said fuel passage means and, an electrical connector means operably positioned in said nozzle body means with one end thereof in operable contact with said heater means and with its other end being connectable to a source of electrical power whereby an electrical current can be caused to flow through said heater means to effect heating of fuel in said passage means whereby to provide for the flash-injection of fuel during opening movement of said valve.

2. A fuel injection nozzle for use to effect flash injection of fuel, said nozzle including a nozzle body means of electrical conductive material having an outlet at one end thereof and a fuel passage means connectable at one end to a source of pressurized fuel and in communication at its other end with said outlet and having a valve seat encircling said outlet, a valve of electrical conductive material operably positioned in said fuel passage means for movement into and out of engagement with said valve seat, a spring means operatively associated with said valve to normally bias it into engagement with said valve seat, an electrical insulator means encircling said valve intermediate its ends, an annular electrical conductor fixed to and encircling one end of said insulator means, an electrical heater means wound on said insulator means and operatively connected at one end to said conductor and at its other end to said valve and, an electrical brush means operably positioned in said nozzle body means with one end thereof in sliding contact with said conductor and its other end being connectable to a source of electrical power whereby an electrical current can be caused to flow through said heater means to effect heating of fuel in said passage means whereby to provide for the flash-injection of fuel during opening movement of said valve.

3. A fuel injection nozzle with internal heater, said nozzle including a nozzle body means of electrical conductive material having a spray outlet at one end thereof and a fuel passage means connectable at one end to a source of pressurized fuel and in communication at its other end with said spray outlet and having a valve seat encircling said spray outlet, a valve of electrical conductive material operably positioned in said fuel passage means for movement into and out of engagement with said valve seat, a spring means operatively associated with said valve to normally bias said valve into engagement with said valve seat, an electrical insulator means fixed to and encircling said valve intermediate its ends, an annular electrical conductor fixed to one end of said insulator means, an electrical heater means wound on said insulator means and connected at one end to said conductor and at its other end to said valve and, an electrical brush means operably positioned in said nozzle body means with one end thereof in sliding contact with said conductor and its other end being connectable to a source of electrical power whereby an electrical current can be caused to flow through said heater means to effect heating of fuel in said passage means close to said spray outlet whereby to provide for the flash-injection of fuel during opening movement of said valve.

* * * * *